United States Patent
Crema et al.

(10) Patent No.: US 11,439,157 B2
(45) Date of Patent: Sep. 13, 2022

(54) ICE CREAM MAKER FITTING FOR A STAND MIXER, ICE CREAM MAKER KIT FOR A STAND MIXER AND STAND MIXER

(71) Applicant: SMEG S.p.A., Guastalla (IT)

(72) Inventors: Andrea Crema, Guastalla (IT); Leopoldo Bazzicalupo, Sale Marasino (IT); Raffaella Mangiarotti, Milan (IT)

(73) Assignee: SMEG S.P.A., Guastalla (IT)

( * ) Notice: Subject to any disclaimer, the term of this patent is extended or adjusted under 35 U.S.C. 154(b) by 332 days.

(21) Appl. No.: 16/783,314

(22) Filed: Feb. 6, 2020

(65) Prior Publication Data

US 2020/0245638 A1 Aug. 6, 2020

(30) Foreign Application Priority Data

Feb. 6, 2019 (IT) .......................... 102019000001727

(51) Int. Cl.
*A23G 9/22* (2006.01)

(52) U.S. Cl.
CPC ............. *A23G 9/222* (2013.01); *A23G 9/224* (2013.01)

(58) Field of Classification Search
CPC ........... A23G 9/12; A23G 9/222; A23G 9/224
USPC .................................. 366/206, 266, 144, 145
See application file for complete search history.

(56) References Cited

U.S. PATENT DOCUMENTS

| | | | |
|---|---|---|---|
| 4,643,583 A | * | 2/1987 | Cecchini ................ A23G 9/12 62/343 |
| 4,736,600 A | | 4/1988 | Brown |
| D828,092 S | | 9/2018 | Dietz et al. |
| 2006/0101842 A1 | | 5/2006 | Boulos et al. |

FOREIGN PATENT DOCUMENTS

| | | | |
|---|---|---|---|
| BR | 8505264 A | 5/1987 | |
| DE | 3806508 A1 | 9/1989 | |
| DE | 3921115 A1 | 1/1991 | |
| DE | 10048535 A1 | 2/2002 | |
| EP | 3336454 A1 | 6/2018 | |
| EP | 3369353 A1 | 9/2018 | |
| GB | 2144208 A | 2/1985 | |
| GB | 2187110 | * 3/1987 | ............... B01F 7/16 |
| WO | WO2012113018 A1 | 8/2012 | |

OTHER PUBLICATIONS

Screen capture from YouTube vide clip entitled "KitchenAid Ice Cream Maker Blogger review and demonstration", 1 page, uploaded on Mar. 13, 2017 by user "Best Buy Canada Product Videos", Retrieved from internet <https://www.youtube.com/watch?v=pMx0XA4zIOo> (Year: 2017).*

Italian Search Report and Written Opinion issued by Ministero dello Sviluppo Economico for Italian Application No. IT201900001727, dated Sep. 17, 2019, pp. 1-9.

* cited by examiner

*Primary Examiner* — Cassey D Bauer
(74) *Attorney, Agent, or Firm* — The Belles Group, P.C.

(57) ABSTRACT

An ice cream maker fitting for a stand mixer provided with a bowl includes a double wall vessel having an outer wall and an inner wall, which are coupled so as to define between the outer wall and the inner wall a sealed space. A refrigerant fluid is arranged. The double wall vessel is sized so as to be arranged, in use, inside the bowl of the stand mixer. A fixing system is configured to fix the double wall vessel to the bowl of the stand mixer.

9 Claims, 6 Drawing Sheets

ICE CREAM MAKER FITTING FOR A STAND MIXER, ICE CREAM MAKER KIT FOR A STAND MIXER AND STAND MIXER

CROSS-REFERENCE TO RELATED APPLICATIONS

This patent application claims priority from Italian Patent Application No. 102019000001727 filed on Feb. 6, 2019, the entire disclosure of which is incorporated herein by reference.

TECHNICAL FIELD

The invention relates to an ice cream maker fitting for a stand mixer, to an ice cream maker kit for a stand mixer and to a stand mixer.

In particular, the invention relates to a fitting and to a kit for a stand mixer with a "planetary" movement.

BACKGROUND ART

Stand mixers of this type, indeed, are provided with different fittings, which expand the functions of the stand mixer itself beyond the simple mixing action.

The attention of manufacturers is focused on providing fittings that are easy to be used and, at the same time, ensure satisfying results from the functional point of view.

DISCLOSURE OF INVENTION

Therefore, it is an object of the invention to provide an ice cream maker fitting for a stand mixer, which is functional and efficient and, at the same time, is simple to be manufactured and easy to be used.

According to this object, the invention relates to an ice cream maker fitting for a stand mixer provided with a bowl; the fitting comprising:

a double wall vessel comprising an outer wall and an inner wall, which are coupled so as to define between the outer wall and the inner wall a sealed space, wherein a refrigerant fluid is arranged; the double wall vessel being sized so as to be arranged, in use, inside the bowl of the stand mixer;

a fixing system configured to fix the double wall vessel to the bowl of the stand mixer.

A further object of the invention is to provide an ice cream maker kit, which is easy to be mounted and, at the same time, ensures satisfying results from the functional point of view.

In accordance with this object, the invention relates to an ice cream maker kit according to claim 10.

Finally, a further object of the invention is to provide a stand mixer, which is capable of creating ice cream in a simple and effective manner, ensuring a high-quality result.

In accordance with this object, the invention relates to a stand mixer according to claim 11.

BRIEF DESCRIPTION OF THE DRAWINGS

Further features and advantages of the invention will be best understood upon perusal of the following description of a non-limiting embodiment thereof, with reference to the accompanying drawing, wherein.

BEST MODE FOR CARRYING OUT THE INVENTION

Figure 1:
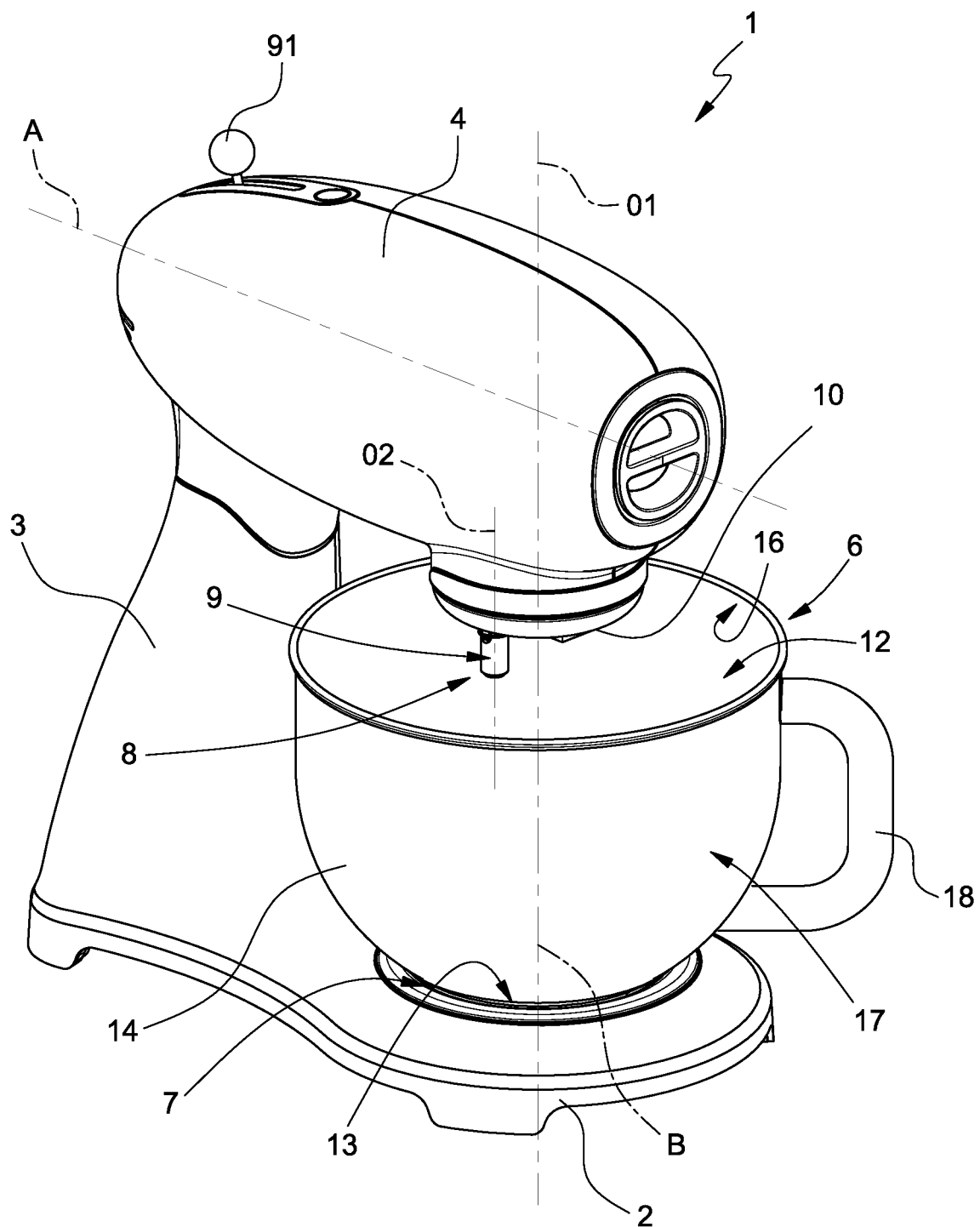
FIG. 1 is a perspective view, with parts removed for greater clarity, of a stand mixer.

In FIG. 1, reference number 1 indicates a stand mixer. The stand mixer 1 is commonly designed to stand on a table.

The stand mixer 1 basically is a home appliance provided with a base 2, an upright 3 vertically projecting from the base 2, a main body 4 hinged to the vertical upright 3, at least one motor (not visible in the accompanying figures) and at least one bowl 6.

The base 2 is provided with a seat 7, which is designed to be selectively engaged by the bowl 6.

The base 2 and the bowl 6 are preferably configured so as to form a firm coupling, for example a bayonet coupling.

According to a variant which is not shown herein, the bowl 6 can be fixed to the upright 3, for example by means of one or more arms.

The main body 4 extends around an axis A and is hinged to the upright 3 so as to be movable between an operating position and a non-operating position.

In the operating position, the axis A of the main body is substantially orthogonal to the vertical axis. In other words, the axis A of the main body is horizontal.

In the non-operating position, the main body 4 is raised relative to the operating position. In the non-operating position, the axis A of the main body is transverse to the vertical axis, but not orthogonal thereto.

The motor (which is not shown in the accompanying figures for the sake of simplicity) is preferably housed in the main body 4.

The main body 4 also houses, on the inside, a gear (also not visible in the figures), which is configured to transform the rotary motion of the shaft of the motor (not visible) into a planetary motion of an attack pin 8, which is provided with a free portion 9 projecting out of the main body 4.

The free portion 9 of the attack pin 8 is configured to be coupled, in use, to a respective tool (not shown in the accompanying figures).

The tool generally is a kneading tool, such as for example a whisker or a dough hook, etc.

In the operating position, the free portion 9 of the attack pin 8 always faces the inside of the bowl 6 during the entire planetary movement. In this way, the tool, in use, is housed inside the bowl 6.

In detail, the gear is configured to rotate a cap 10 of the main body 4 around a first rotation axis O1 and to rotate the attack pin 8 around a further rotation axis O2. The attack pin 8 is fixed to the rotating cap 10. The first rotation axis O1 and the second rotation axis O2 are parallel.

The direction of rotation of the cap 10 around the first rotation axis preferably is contrary to the direction of rotation of the attack pin 8 around the second axis O2. In this way, in use, the action of the tool inside the bowl 6 is optimized.

Basically, thanks to the gear, the attack pin 8 carries out a planetary movement, since it makes a rotation movement around its own axis (O2) and, at the same time, a rotation movement around another parallel axis (O1).

The bowl 6 extends around an axis B and defines a processing chamber 12. In detail, the bowl 6 has a bottom wall 13 and a side wall 14. The bottom wall 13 and the side wall 14 are preferably manufactured as one single piece.

The bottom wall 13 defines an inner bottom face (not visible in the accompanying figures), which faces the processing chamber 12, and an outer bottom wall (not visible in the accompanying figures), which is preferably coupled to the base 2.

The inner bottom wall preferably has substantially a semi-spherical shape.

The side wall 14 defines an inner side face 16, which faces the processing chamber 12, and an outer side face 17, which is provided with a handle 18.

The bowl 6, when it is coupled to the base, is preferably centred relative to the rotation axis O1. In other words, when the bowl is coupled to the base, the axis B coincides with the axis O1.

Figure 2:
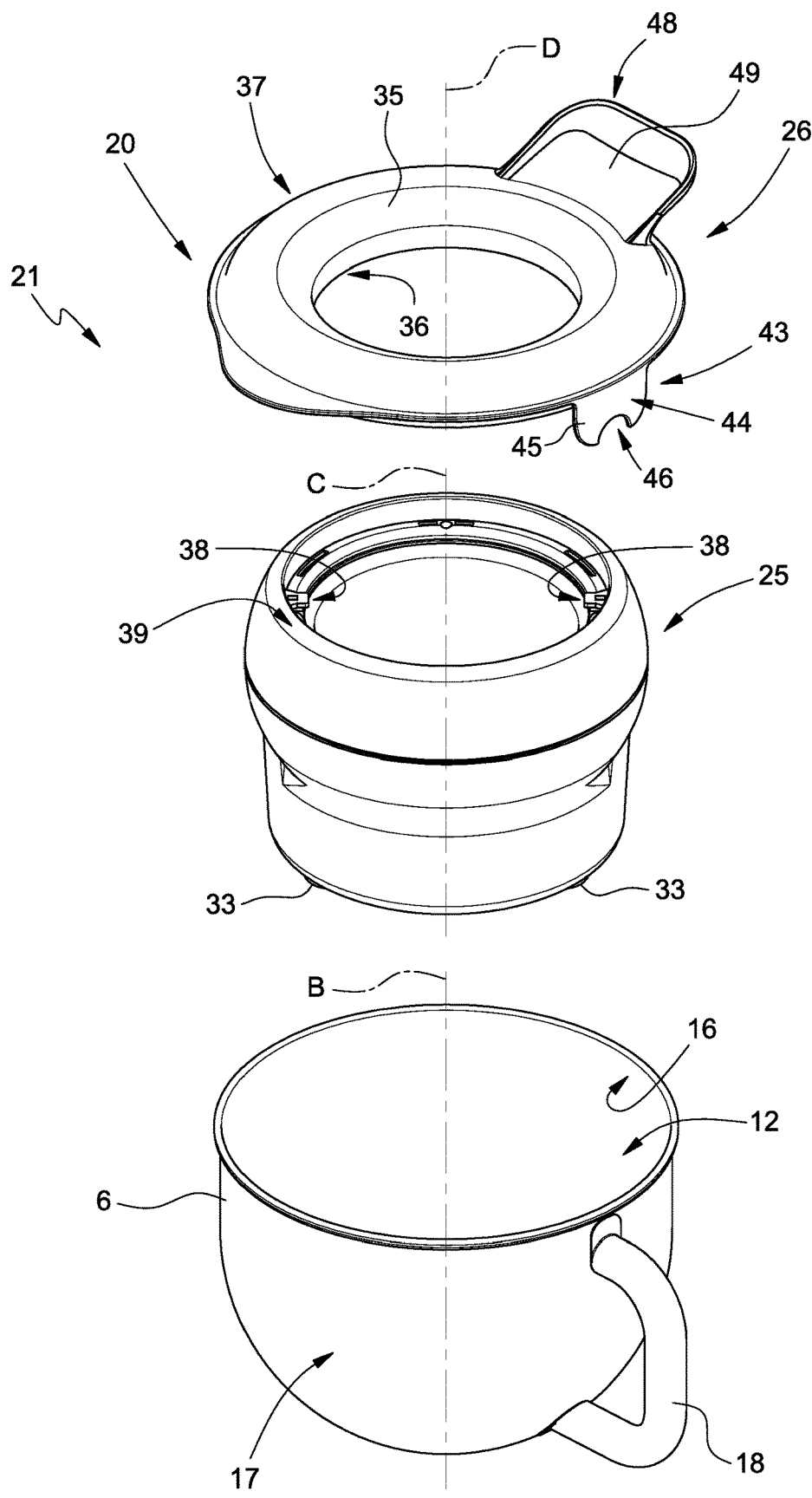
FIG. 2 is an exploded perspective view, with parts removed for greater clarity, of a first detail of an ice cream maker kit according to the invention and of a portion of the stand mixer.

FIG. 2 shows a first ice cream maker fitting 20 of an ice cream maker kit 21 according to the invention.

Figure 5:
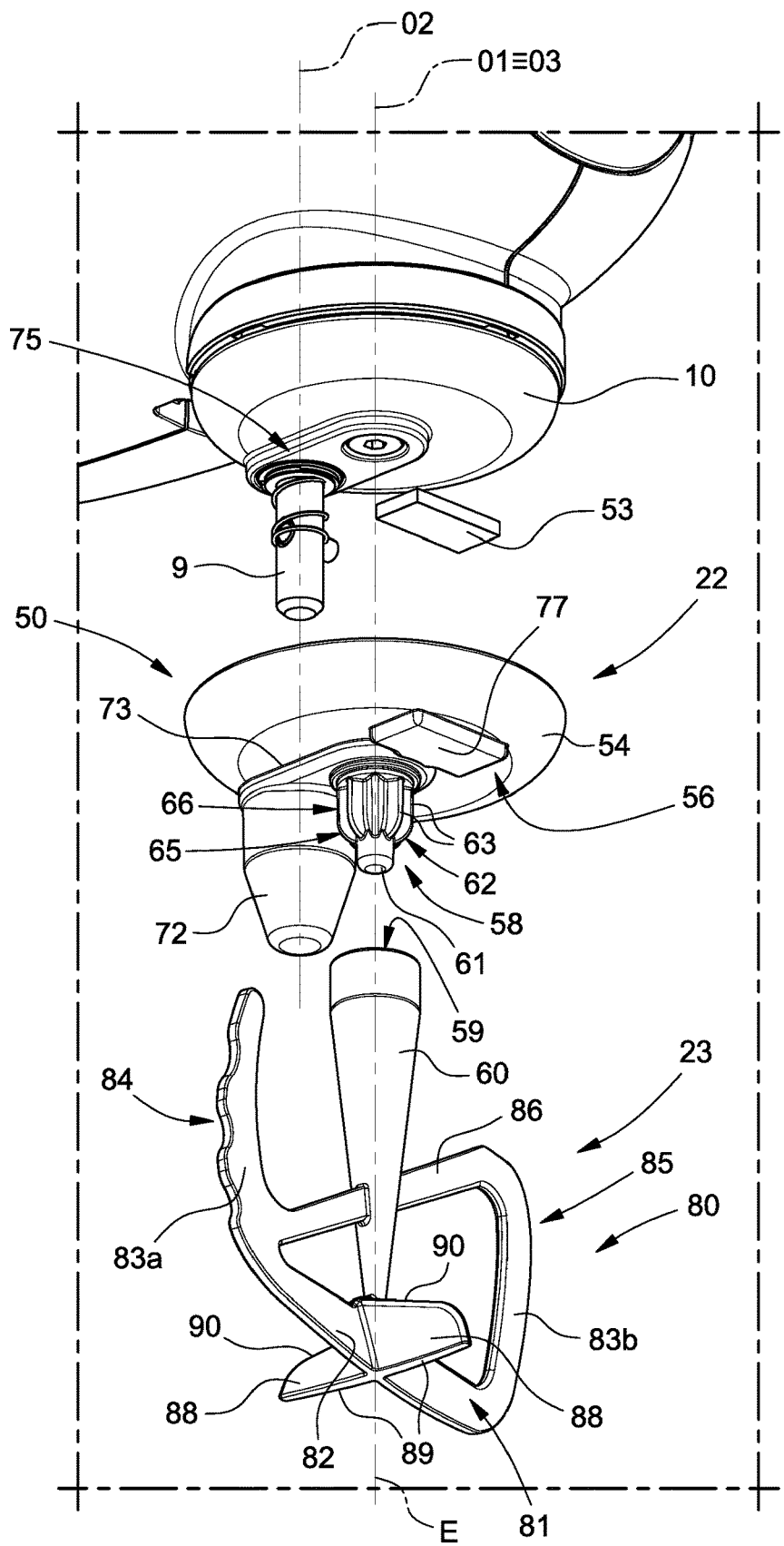
FIG. 5 is an exploded perspective view, with parts removed for greater clarity, of a fourth detail of an ice cream maker kit according to the invention and of a portion of the stand mixer.
Figure 6:
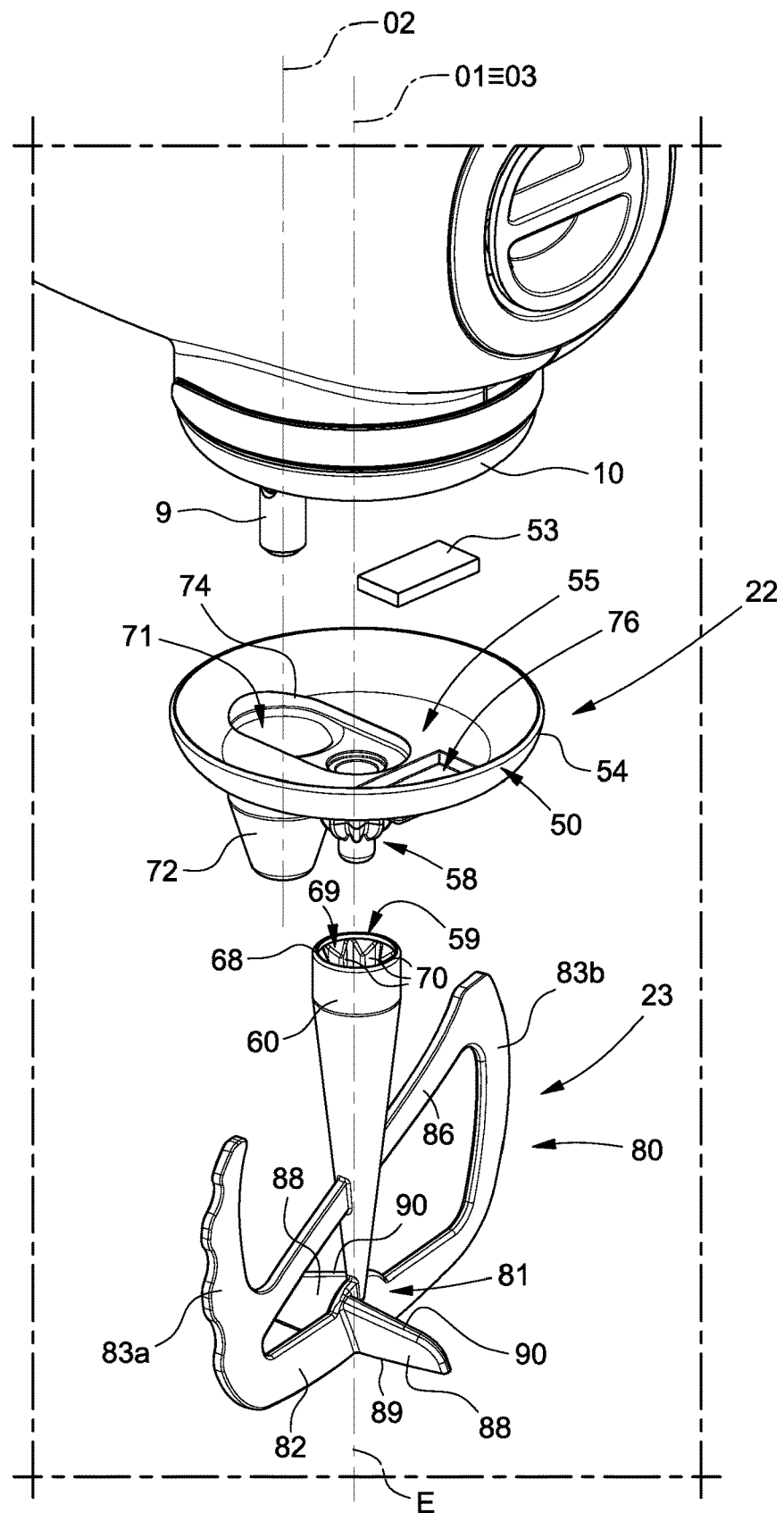
FIG. 6 is a further exploded perspective view, with parts removed for greater clarity, of the fourth detail of FIG. 5 from a different angle.

The ice cream maker kit 21 further comprises a second fitting 22 (shown in FIGS. 5, 6 and 7) and a blade for processing the ingredients 23 (visible in FIGS. 5, 6).

The first fitting 20 comprises a double wall vessel 25 and a fixing system 26 configured to fix the double wall vessel 25 to the bowl 6 of the stand mixer 1.

Figure 4:
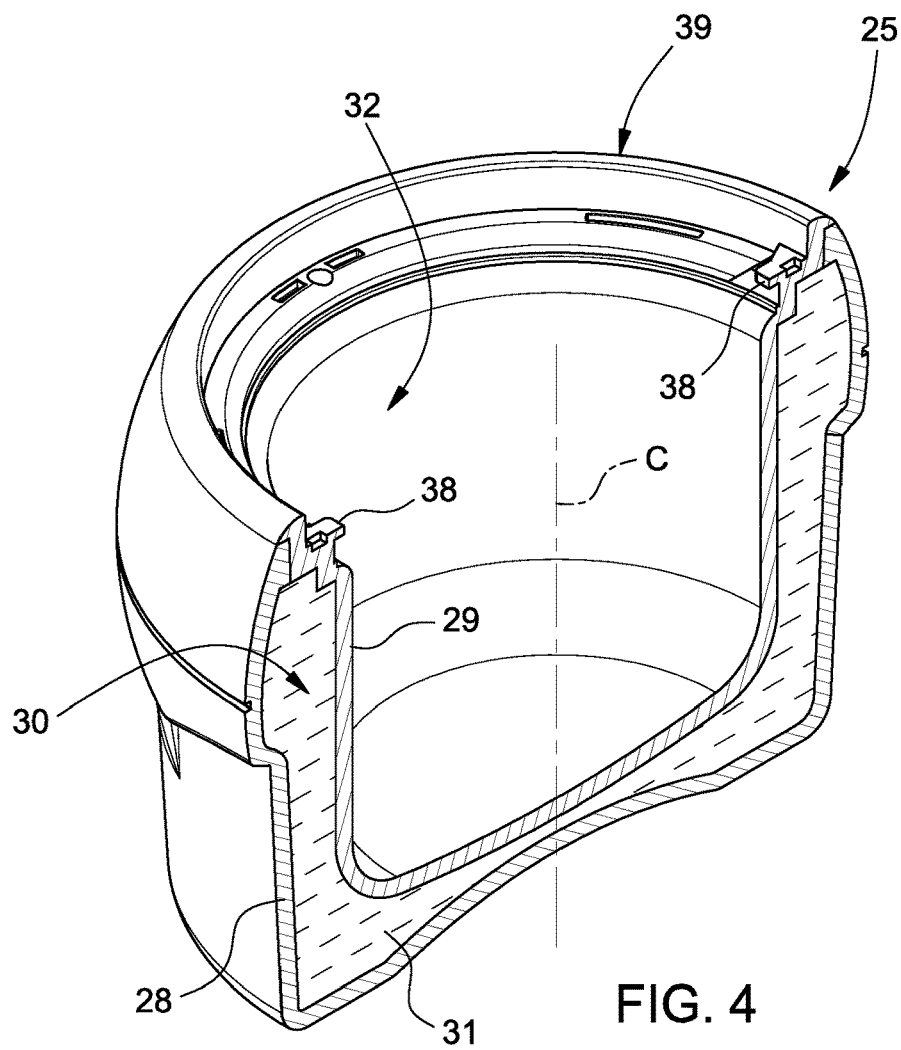
FIG. 4 is a sectional perspective view of a third detail of the ice cream maker kit of FIG. 2.

With reference to FIG. 4, the double wall vessel 25 extends around an axis C and comprises an outer wall 28 and an inner wall 29, which are coupled so as to define, between the outer wall 28 and the inner wall 29, a sealed space 30, wherein a refrigerant fluid 31, preferably a refrigerant liquid, is arranged.

The refrigerant liquid 31 preferably is a mixture of water and sodium chloride. The concentration of said sodium chloride preferably ranges from 20% to 30% and preferably is equal to 23%.

The inner wall 29 is preferably configured to define a chamber 32 with a substantially cylindrical shape.

The inner wall 29 preferably is at least partially made of a metal material (for example stainless steel) so as to enhance the transmission of heat as well as the cooling of the ingredients arranged in the chamber 32 of the double wall vessel 25.

With reference to FIG. 2, the double wall vessel 25 is at least partly housed, in use, inside the processing chamber 12 of the bowl 6 and is provided with a plurality of support pins 33, which are configured so as to rest against the inner bottom wall of the bowl 6. The support pins 33 are preferably made of a non-slip material.

In use, the double wall vessel 25 has to be left in a freezer for an amount of time of at least 12 hours, so that the refrigerant liquid freezes. After having been frozen, the refrigerant liquid can preserve a desired temperature (for example approximately −10° C.) for an amount of time of at least 2 hours. This allows for a reduction of the temperature of the ingredients, so that they thicken during the mixing.

The fixing system 26 comprises an annular element 35 extending around an axis D and provided with an inner edge 36 and with an outer edge 37. The inner edge 36 is coupled to the double wall vessel 25 and the outer edge 37 is coupled to the bowl 6 of the stand mixer 1.

The inner edge 36 is preferably coupled to the double wall vessel 25 by means of a bayonet coupling system.

In the non-limiting example described and shown herein, the double wall vessel 25 is provided with two male bayonet components 38, which project from the double wall vessel 25, substantially close to a peripheral edge 39 of the container 25, so as to engage two respective female bayonet components 40 (only one of them being visible in FIG. 3) of the inner edge 36 of the annular element 35. The male bayonet components 38 preferably are two teeth, which project from the inner wall 29, close to the peripheral edge 39 of the double wall vessel 25.

Figure 3:
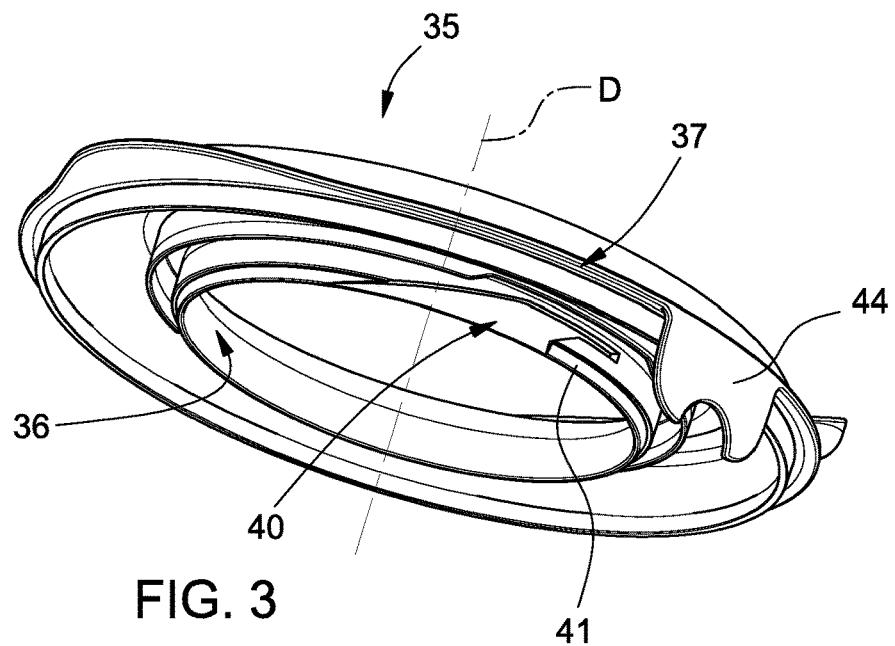
FIG. 3 is a perspective view of a second detail of the ice cream maker kit of FIG. 2.

With reference to FIG. 3, the female bayonet components 40 are two grooves (only one of them being visible in FIG. 3) made in an annular wall 41 axially projecting from the inner edge 36 of the annular element 35.

The outer edge 37 of the annular element 35 is coupled to the bowl 6 by means of an anti-rotation device 43. The anti-rotation device 43 is configured to prevent the double wall vessel 25 and the bowl 6 from rotating relative to one another.

In the non-limiting example shown herein, the anti-rotation device 43 comprises a fixing element 44, which can be coupled to the handle 18 of the bowl 6.

Figure 7:
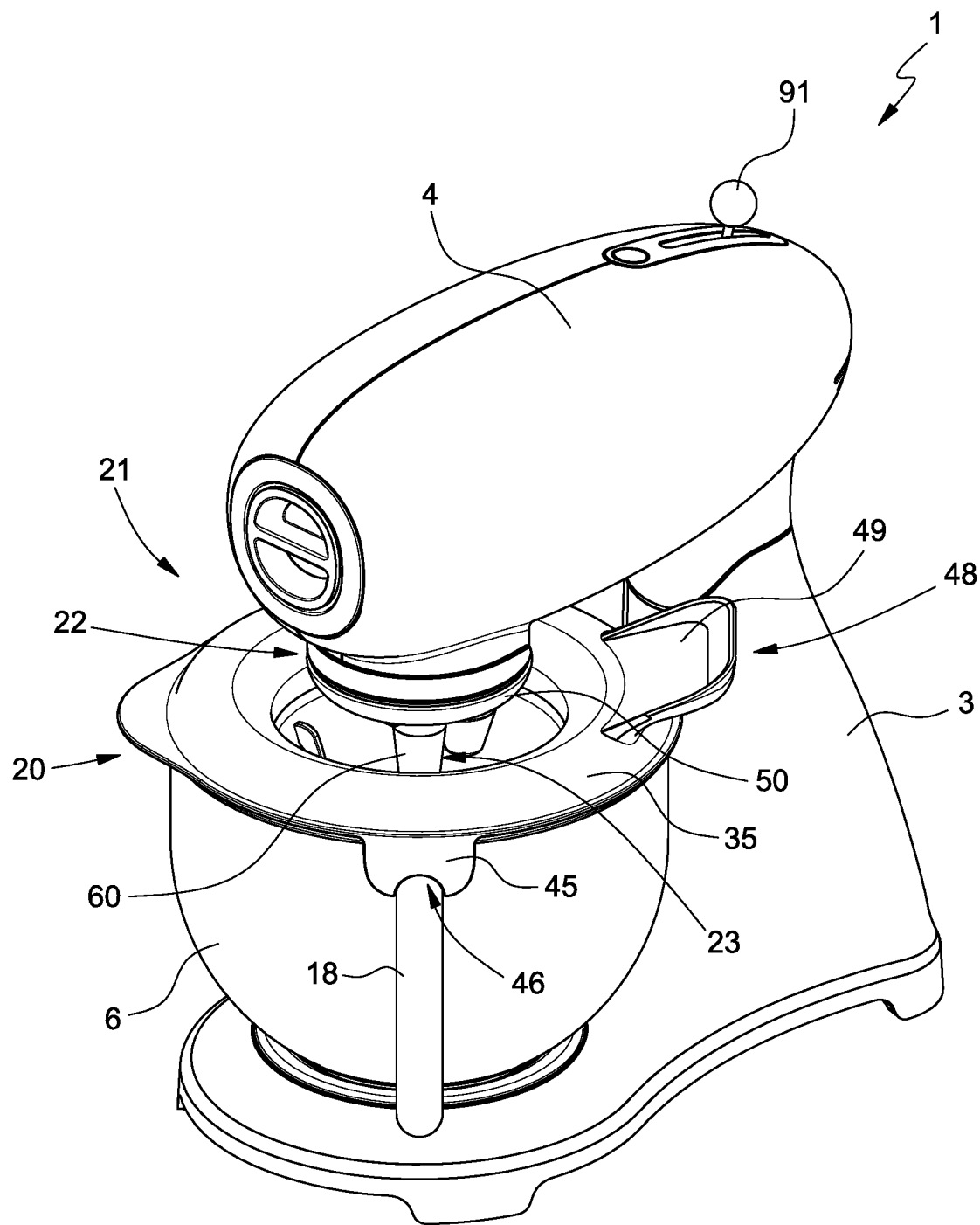
FIG. 7 is a perspective view, with parts removed for greater clarity, of the stand mixer and of the ice cream maker kit according to the invention.

In particular, the fixing element 44 comprises a tongue 45, which axially projects from the outer edge 37 of the annular element 35 towards the bowl 6, so as to cooperate with at least a portion of the handle 18. The tongue 45 is preferably provided with an open seat 46, which is configured to house, in use, a portion of the handle 18 of the bowl 6 of the stand mixer 1, so as to lock rotary movements of the annular element 35 relative to the bowl 6. FIG. 7 shows the handle 18 engaging the seat 46.

In other words, the seat 46 is a recess of the tongue having an axial length that is such as to house a portion of the handle 18 that is sufficient to avoid the relative rotary movement between the annular element 35 and the bowl 6.

The tongue 45 basically acts like a fork which, coupled to the handle 18 of the bowl 6, prevents the double wall vessel 25 from freely rotating during the operation of the stand mixer 1.

According to a variant which is not shown herein, the outer edge of the annular element 35 is provided with one or more locking elements configured to fix the annular element 35 to the edge of the bowl 6.

Advantageously, the annular element 35 makes sure that the double wall vessel 25 is centred relative to the bowl 6. In other words, the axis C of the double wall vessel 25 coincides with the axis B of the bowl 6.

The annular element 35 is preferably provided with a slide 48 provided with a sliding plane 49.

The slide 48 is coupled to the annular element 35 so that the sliding plane 49 of the slide 48 is connected to the inner edge 36 of the annular element 35 without gaps.

The slide 48, in use, helps ice cream ingredients be introduced into the double wall vessel 25 even when the motor is active.

FIGS. 5 and 6 show the second ice cream maker fitting 22 and the ingredient processing blade 23 of the ice cream maker kit 21 according to the invention.

The second ice cream maker fitting 22 comprises an adapter element 50, which is configured to cause a rotation of the ingredient processing blade 23 coupled to it around a rotation axis O3. The rotation axis O3 preferably coincides with the rotation axis O1.

In other words, the adapter element 50 is configured to obtain a rotary motion of the ingredient processing blade 23 around one single axis, preferably the same rotation axis O1 as the cap 10.

The adapter element 50 is coupled to the movable cap 10 of the main body 4.

The coupling between the adapter element 50 and the movable cap 10 preferably is a magnetic coupling.

The adapter element 50 preferably comprises a magnet 53 and the cap 10 (or the main body 4) comprises at least one metallic element (not visible in the accompanying figures) capable of attracting the magnet 53. The movable cap 10 preferably comprises an element made of cast iron (not visible in the accompanying figures).

The adapter element 50 comprises a plate 54 provided with an inner face 55 (better visible in FIG. 6), which is designed to be coupled to the cap 10 of the main body 4, and with an outer face 56 (better visible in FIG. 5), which is designed to face, in use, the double wall container 25.

Along the outer face 56, the adapter element 50 is provided with a coupling element 58, which is configured to be coupled to the ingredient processing blade 23.

The coupling element 58 preferably is a pin projecting from the outer face 56, substantially orthogonally to the outer face 56.

The pin 58 is preferably arranged so as to be coaxial to the rotation axis O1 of the cap 10 of the main body 4.

The pin 58 preferably is hollow.

The pin 58 is preferably shaped so as to be easily coupled to the ingredient processing blade 23. In particular, the shape of the pin 58 facilitates the self-centering of the pin 58 itself in a respective seat 59 made in a shaft 60 of the ingredient processing blade 23.

According to a variant which is not shown herein, the ingredient processing blade 23 is provided with a pin engaging a respective seat obtained in the adapter element 50.

The pin 58 is preferably manufactured as one single piece together with the plate 54.

With reference to FIG. 5, the pin 58 has a cylindrical end portion 61 and a toothed portion 62, which is provided with teeth 63 with oblique sides and is contiguous to the cylindrical end portion 61.

The toothed portion 62 has a substantially truncated cone shaped part 65 and a substantially cylindrical part 66. The truncated cone shaped part 65 is placed in contact with the end portion 61 and has a diameter that increases starting from the end portion 61 up to the cylindrical part 66.

With reference to FIG. 6, the seat 59 in the shaft 60 of the ingredient processing blade 23 is defined by a wall 68 provided with an inner face 69 provided with grooves 70 with oblique sides, which are complementary to the teeth 63 of the toothed portion 62 of the pin 58.

The plate 54 further has a through hole 71, which is placed so as to be engaged by the attack pin 9 when the adapter element 50 is coupled to the cap 10 of the main body 4.

The adapter element 50 is preferably provided with a covering element 72 in the area of the through hole 71, which is configured to cover the attack pin 9. The covering element 72 is preferably defined by a hollow body, which extends around the through hole 71 and protrudes from the outer face 56 of the plate 54. In this way the attack pin 9 is protected from possible squirts during the operation of the stand mixer 1 provided with the ice cream maker kit 21. The covering element 72 preferably has an end portion with the shape of a truncated cone.

The covering element 72 is preferably manufactured as one single piece together with the plate 54.

The covering element 72 faces the pin 58. In the non-limiting example described and shown herein, the covering element 72 and the pin 58 project from a bulge 73 of the outer face 56, which corresponds to a recess 74 of the inner face 55. The recess 74 houses, in use, a respective protrusion 74 of the cap 10.

The magnet 53 is preferably housed in a respective cavity 76 of the inner face 55 corresponding to a protrusion 77 of the outer face 56 of the plate 54.

The ingredient processing blade 23 is provided with a shaft 60 extending along a longitudinal axis E and with at least one processing element 80.

In use, the blade 23 is arranged in the double wall vessel 25 and is coupled to the pin 58.

When the motor of the stand mixer 1 is activated, the blade 23 rotates around the rotation axis O3 of the pin 58.

The processing element 80 is preferably configured to carry out a combined mixing-lifting-air incorporating action during the rotation of the blade 23.

In particular, the mixing element 80 comprises a substantially U-shaped plate 81, which is provided with a base 82 and with two arms 83a, 83b, which substantially extend parallel to the shaft 60. An arm 83a has a corrugated outer edge 84. The other arm 83b has an outer edge 85, which is shaped so as to substantially scrape a portion of the inner wall 29 of the double wall vessel 25.

The arms 83a, 83b preferably extend parallel to the axis E and the base 82 is orthogonal to the axis E.

The mixing element 80 is preferably also provided with a joining element 86, which connects the free end of the arm 83b to the base of the arm 83a. The joining element 86 preferably intercepts the shaft 60.

According to a variant which is not shown herein, the joining element 86 connects the free end of the arm 83a to the base of the arm 83b.

The mixing element 80 is preferably also provided with two wings 88, which extend from opposite faces of the base 82 of the plate 81 orthogonally to the base 82. The wings are preferably inclined relative to the axis E of the blade 23 and are symmetrical relative to the axis E.

In the non-limiting example described and shown herein, the wings 88 have a flat edge 89, which is designed to be placed in contact with the bottom of the double wall vessel 25 and, a rounded edge 90.

The wings 88, in use, allow the blade 23 to firmly rest against the bottom of the double wall vessel 25 and stiffen the blade 23.

At the same time, the wings 88 help make the mixing action effective, in particular in the initial phases, when an iced crust can form in contact with the inner wall of the double wall vessel 25.

FIG. 7 shows a stand mixer 1 where an ice cream maker kit 21 according to the invention is mounted.

The installation entails coupling the ice cream maker fitting 20 to the bowl 6 of the stand mixer 1 and fixing the bowl 6 to the base 2 of the stand mixer. The ice cream maker fitting 20 must be coupled to the bowl 6 after the double wall vessel 25 has been sufficiently cooled (for example has been left in a freezer for at least 12 hours).

Furthermore, the ice cream maker fitting 22 has to be coupled to the cap 10 of the main body 4 when the main body 4 is in the non-operating position. This last phase can be carried out both before the coupling of the fitting 20 to the bowl 6 and after.

Subsequently, the blade 23 is placed so as to rest against the bottom of the double wall vessel 25 of the stand mixer 1 and the main body 4 is then moved to the operating position. When moving from the non-operating position to the operating position, the pin 58 engages the seat 59 of the shaft 60 of the blade 23, thus self-centering the blade 23 relative to the pin 58.

The controlled activation of the motor (for example through the knob 91 of the main body 4) determines the rotation of the blade 23.

Advantageously, the ice cream maker kit 21 according to the invention is simple to be installed and ensures the production of high-quality ice cream.

In particular, the ice cream maker fitting 20 allows the bowl 6 that comes with the stand mixer 1 to be exploited for the production of ice cream, without requiring dedicated systems for the coupling to the base 2 and without jeopardizing the final appearance of the stand mixer 1.

The ice cream maker fitting 22 allows the blade 23 to be operated in a stable and safe manner. The coupling to the main body 4 is simple and effective and, again, the final appearance of the stand mixer 1 is not jeopardized.

Finally, it is clear that the ice cream maker fitting, the ice cream maker kit and the stand mixer described herein can be subjected to changes and variations, without for this reason going beyond the scope of protection of the appended claims.

The invention claimed is:

1. An ice cream maker fitting for a stand mixer provided with a bowl, the fitting comprising:
   a double wall vessel comprising an outer wall and an inner wall which are coupled so as to define between the outer wall and the inner wall a sealed space wherein a refrigerant fluid is arranged the double wall vessel being sized so as to be arranged, in use, inside the bowl of the stand mixer;
   a fixing system configured to fix the double wall vessel to the bowl of the stand mixer;
   wherein the fixing system comprises an annular element extending about an axis and provided with an inner edge and an outer edge, the inner edge being coupled to the double wall vessel and the outer edge being coupled to the bowl of the stand mixer;
   wherein the outer edge of the annular element is coupled to the bowl by means of an anti-rotation device configured to block the relative rotation between the double wall vessel and the bowl;
   wherein the anti-rotation device comprises a fixing element couplable to a handle of the bowl; and
   wherein the fixing element comprises a tongue, which protrudes axially from the outer edge of the annular element and is provided with an open seat configured to house, in use, a portion of the handle of the bowl of the stand mixer so as to block the rotational movements of the annular element with respect to the bowl.

2. The fitting according to claim 1, wherein the inner edge is coupled to the double wall vessel by means of a bayonet coupling system.

3. The fitting according to claim 2, wherein the double wall vessel is provided with at least one bayonet male component, which protrudes from the double wall vessel substantially close to a perimetric edge of the double wall vessel, and the inner edge of the annular element is provided with at least one respective bayonet female component.

4. The fitting according to claim 1, wherein the annular element is provided with a slide provided with a sliding plane, the slide being coupled to the annular element so that the sliding plane of the slide is connected to the inner edge of the annular element seamlessly.

5. The fitting according to claim 1, wherein the double wall vessel is provided with a plurality of support pins configured to be arranged on a bottom face of the bowl of the stand mixer.

6. An ice cream maker kit for a stand mixer comprising:
   an ice cream maker fitting as claimed in claim 1;
   a blade for processing ingredients, which is configured to be housed, in use, in the double wall vessel of the ice cream maker fitting; and
   a further ice cream maker fitting, configured to be coupled, in use, to a rotating element of the stand mixer and to the blade, the further ice cream maker fitting being configured to cause a rotation of the blade about a rotation axis.

7. A stand mixer comprising:
   at least a bowl and at least one ice cream maker fitting as claimed in claim 1.

8. The stand mixer according to claim 7, wherein the stand mixer is of a planetary movement type.

9. The stand mixer according to claim 7, comprising:
   a base;
   an upright which protrudes vertically from the base;
   a main body hinged to the upright;
   at least one motor; and
   at least one gear coupled to the shaft of the motor and configured to rotate an element of the main body about a first rotation axis and to rotate an attack pin about a further rotation axis, the attack pin being fixed to the rotating element.

* * * * *